(12) United States Patent
Shin

(10) Patent No.: US 10,209,742 B2
(45) Date of Patent: Feb. 19, 2019

(54) DISPLAY EXPANSION TYPE MOBILE TERMINAL WITH SLIDING MOTION

(71) Applicant: Jin Cheol Shin, Chungcheongbuk-do (KR)

(72) Inventor: Jin Cheol Shin, Chungcheongbuk-do (KR)

( * ) Notice: Subject to any disclaimer, the term of this patent is extended or adjusted under 35 U.S.C. 154(b) by 0 days.

(21) Appl. No.: 15/579,791

(22) PCT Filed: Dec. 30, 2016

(86) PCT No.: PCT/KR2016/015593
§ 371 (c)(1),
(2) Date: Dec. 5, 2017

(87) PCT Pub. No.: WO2017/119679
PCT Pub. Date: Jul. 13, 2017

(65) Prior Publication Data
US 2018/0188778 A1   Jul. 5, 2018

(30) Foreign Application Priority Data

Jan. 4, 2016 (KR) .................. 10-2016-0000257
Oct. 7, 2016 (KR) .................. 10-2016-0130102

(51) Int. Cl.
*H05K 5/00* (2006.01)
*G06F 1/16* (2006.01)

(52) U.S. Cl.
CPC .......... *G06F 1/1652* (2013.01); *G06F 1/1624* (2013.01)

(58) Field of Classification Search
CPC ....................................................... G06F 1/16
USPC ................................................... 361/679.01
See application file for complete search history.

(56) References Cited

U.S. PATENT DOCUMENTS

| 8,290,549 | B2 | 10/2012 | Reeves et al. ............. 455/575.3 |
| 8,493,726 | B2 | 7/2013 | Visser et al. .............. 361/679.3 |
| 9,286,812 | B2 * | 3/2016 | Bohn ...................... G09F 9/301 |
| 9,829,925 | B2 * | 11/2017 | Lim .......................... G09F 9/00 |
| 2013/0058063 | A1 * | 3/2013 | O'Brien ............... G06F 1/1624 361/807 |

FOREIGN PATENT DOCUMENTS

| KR | 10-0792920 | 1/2008 | .............. H04B 1/38 |
| KR | 10-2013-0062210 | 6/2013 | .............. H04B 1/38 |

* cited by examiner

*Primary Examiner* — Jerry Wu
(74) *Attorney, Agent, or Firm* — Harness, Dickey & Pierce, P.L.C.

(57) ABSTRACT

A display expansion type mobile terminal with a sliding motion, which is disclosed includes: a flexible display device; a fixed end frame to which the first front end is fixed; a via member provided independently of the fixed end frame; an extension frame which extends from the fixed end frame to a position adjacent to the via member in the predetermined display size adjustment direction A; a movable member which is spaced apart from the via member by an interval corresponding to a length of the extension frame; and a connection member.

17 Claims, 6 Drawing Sheets

DISPLAY EXPANSION TYPE MOBILE TERMINAL WITH SLIDING MOTION

CROSS-REFERENCE TO RELATED APPLICATIONS

This application is a national phase application of PCT Application No. PCT/KR2016/015593, filed on 30 Dec. 2016, which claims benefit of Korean Patent Application 10-2016-0000257, filed on 4 Jan. 2016 and Korean Patent Application 10-2016-0130102, filed on 7 Oct. 2016. The entire disclosure of the application identified in this paragraph is incorporated herein by reference.

FIELD

The present disclosure relates to a display expansion type mobile terminal with a sliding motion, and to a display expansion type mobile terminal with a sliding motion in which in a display reduced state, displays are arranged on a front surface and a rear surface, respectively and in a display expanded state, the display of the rear surface moves to the front surface to expand the display of the front surface.

BACKGROUND

This section provides background information related to the present disclosure which is not necessarily prior art.

Currently, mobile terminals such as electronic books, notebook computers, mobile communication terminals are being developed and used as various application devices.

Among them, typically, the mobile communication terminal performs many functions such as a photograph or moving picture shooting, music or video file playback, DMB reception, wireless Internet in addition to a call function which is an original function, but there is a problem in that the display is relatively narrow.

Accordingly, a display expansion type mobile terminal is required, which is easy to carry and has excellent mobility and provides a wider display.

In response to the requirement, a mobile terminal provided with a flexible display device having a flexible property on a screen display unit has been developed.

Various methods have also been attempted in a technology construction for realizing a large screen in a miniaturized state where the mobile terminal is easy to carry.

However, due to a technical limitation of the flexible display device and a limitation of a method for realizing the large screen, the structure is complicated and various restrictions are imposed.

Therefore, a display expansion type mobile terminal is required, which is excellent in portability and mobility, realizes the large screen if necessary, and is simple in construction and saves manufacturing cost.

In this regard, U.S. Pat. No. 8,290,549, Korean Patent Registration No. 10-0792920, U.S. Pat. No. 8,493,726, and Korean Patent Laid-Open Publication No. 10-2013-0062210 may be taken as examples.

PRIOR ART DOCUMENT

Patent Document (Patent Document 0001) 1. U.S. Pat. No. 8,290,549
(Patent Document 0002) 2. Korean Patent Registration No. 10-0792920
(Patent Document 0003) 3. U.S. Pat. No. 8,493,726
(Patent Document 0004) 4. Korean Patent Laid-Open Publication No. 10-2013-0062210

DISCLOSURE

Technical Problem

An object of the present disclosure is to provide a display expansion type mobile terminal with a sliding motion in which in a display reduced state, displays are arranged on a front surface and a rear surface, respectively and in a display expanded state, the display of the rear surface moves to the front surface to expand the display of the front surface.

Technical Solution

This section provides a general summary of the disclosure and is not a comprehensive disclosure of its full scope or all of its features.

In order to solve the above-mentioned problem, according to an aspect of the present disclosure, a display expansion type mobile terminal with a sliding motion includes: a flexible display device provided in a rectangular shape and having a first front end and a second front end at both ends in a predetermined display size adjustment direction A, respectively; a fixed end frame to which the first front end is fixed; a via member provided independently of the fixed end frame, disposed in parallel with the first front end and provided in a columnar shape, and provided in such a manner that as the fixed end frame reciprocates in the predetermined display size adjustment direction A, the flexible display device passes by to surround the circumference of the fixed end frame; an extension frame which extends from the fixed end frame to a position adjacent to the via member in the display size adjustment direction A; a movable member which is spaced apart from the via member by an interval corresponding to a length of the extension frame; and a connection member having one end fixed to the second front end and the other end fixed to the terminal end of the extension frame via the movable member and guiding a movement path of the second front end with a reciprocating motion of the fixed end frame in the predetermined display size adjustment direction A.

According to the aspect of the present disclosure, the display expansion type mobile terminal with a sliding motion may further include a main body coupled with the via member and having the movable member, in which the main body may include a guide groove which accommodates the extension frame to reciprocate in the predetermined display size adjustment direction A and has an inlet end through which the extension frame is accommodated and a terminal end which is an opposite side to the inlet end, the via member may be disposed at a position adjacent to the terminal end of the guide groove in a direction perpendicular to the extension frame, and the movable member may be disposed at a position adjacent to the inlet end of the guide groove.

According to the aspect of the present disclosure, in the display expansion type mobile terminal with a sliding motion, the connection member may be provided as a flexible member and disposed in parallel with the extension frame at a portion where the second front end and the movable member are connected.

According to the aspect of the present disclosure, in the display expansion type mobile terminal with a sliding motion, the main body may include an external frame having the opened upper and lower surfaces, a rectangular parallelepiped accommodation space therein, and a fixed end contact surface corresponding to the fixed end frame on one side, the via member disposed in parallel with the fixed end frame on the opposite side of the fixed end contact surface as the interior of the accommodation space and having both longitudinal ends supported by the external frame, and a support member which is disposed and fixed in the space between the fixed end contact surface and the via member and supports the flexible display devices disposed on the upper and lower surfaces thereof and has at least one fixed end guide slot provided on at least one surface of the upper and lower surfaces and disposed in parallel with the predetermined display size adjustment direction A.

According to the aspect of the present disclosure, in the display expansion type mobile terminal with a sliding motion, the fixed end frame may have a fixed end guide protrusion which is coupled to at least one fixed end guide slot and slidably moves.

According to the aspect of the present disclosure, in the display expansion type mobile terminal with a sliding motion, the guide groove and the movable member may be provided on at least one of both side surfaces of the support member corresponding to both longitudinal ends of the via member.

According to the aspect of the present disclosure, in the display expansion type mobile terminal with a sliding motion, the guide groove may be provided as at least one fixed end guide slot, the extension frame may be provided as the fixed end guide protrusion, and the movable member may be provided as a convex curved surface which is formed on the side surface of the support member corresponding to the fixed end frame and extends from the lower surface of the support member to at least one fixed end guide slot.

According to the aspect of the present disclosure, in the display expansion type mobile terminal with a sliding motion, the movable member may guide the connection member of which one end is coupled to the fixed end guide protrusion to at least one fixed end guide slot.

According to the aspect of the present disclosure, in the display expansion type mobile terminal with a sliding motion, the main body may include the external frame having the opened upper and lower surfaces, a rectangular parallelepiped accommodation space therein, and a fixed end contact surface corresponding to the fixed end frame on one side, the via member disposed in parallel with the fixed end frame on the opposite side of the fixed end contact surface as the interior of the accommodation space and having both longitudinal ends supported by the external frame, the support member which is disposed and fixed in the space between the fixed end contact surface and the via member and supports the flexible display devices disposed on the upper and lower surfaces thereof, and a link member having both ends coupled to the fixed end frame and the fixed end contact surface and folded when the fixed end frame moves in the predetermined display size adjustment direction A and in which the guide groove and the movable member may be provided on at least one of both side surfaces of the support member corresponding to both longitudinal ends of the via member.

According to the aspect of the present disclosure, in the display expansion type mobile terminal with a sliding motion, two display expansion type mobile terminals with a sliding motion may be provided, two display expansion type mobile terminals with a sliding motion may be disposed symmetrically to each other, the first front ends of two display expansion type mobile terminals may be connected to each other, and the respective fixed end frames may be pivotably hinged with a longitudinal direction of the fixed end frame as an axis below surfaces facing each other.

Advantageous Effects

According to the present disclosure, since in a display reduced state, displays are arranged on a front surface and a rear surface, respectively and in a display expanded state, the display of the rear surface moves to the front surface to expand the display of the front surface, simple operations including a call function, and the like can performed in the display reduced state and portable TV function, a notebook computer function, and the like can be performed in the display expanded state.

According to the present disclosure, it is possible to naturally protect a portion where a flexible display device is folded by a main body and a fixed end frame from an external impact.

MODE FOR INVENTION

Hereinafter, an embodiment in which a display expansion type mobile terminal with a sliding motion is implemented according to the present disclosure will be described in detail with reference to the drawings.

However, it is to be understood that the scope of the present disclosure is not limited by the embodiments described below, and those skilled in the art, which understands the spirit of the present disclosure can easily propose various embodiments included in the scope of the same technical spirit as the present disclosure by a method such as substitution or change, but it will be apparent that this is also included in the technical spirit of the present disclosure.

Further, since terms used below are selected for easy description, the terms are not limited to dictionary meanings and should be appropriately interpreted as meanings consistent with the technical spirit of the present disclosure in order to grasp the technical content of the present disclosure.

FIGS. 1 to 4 are diagrams for describing a first embodiment of a display expansion type mobile terminal with a sliding motion according to the present disclosure.

Figure 1:
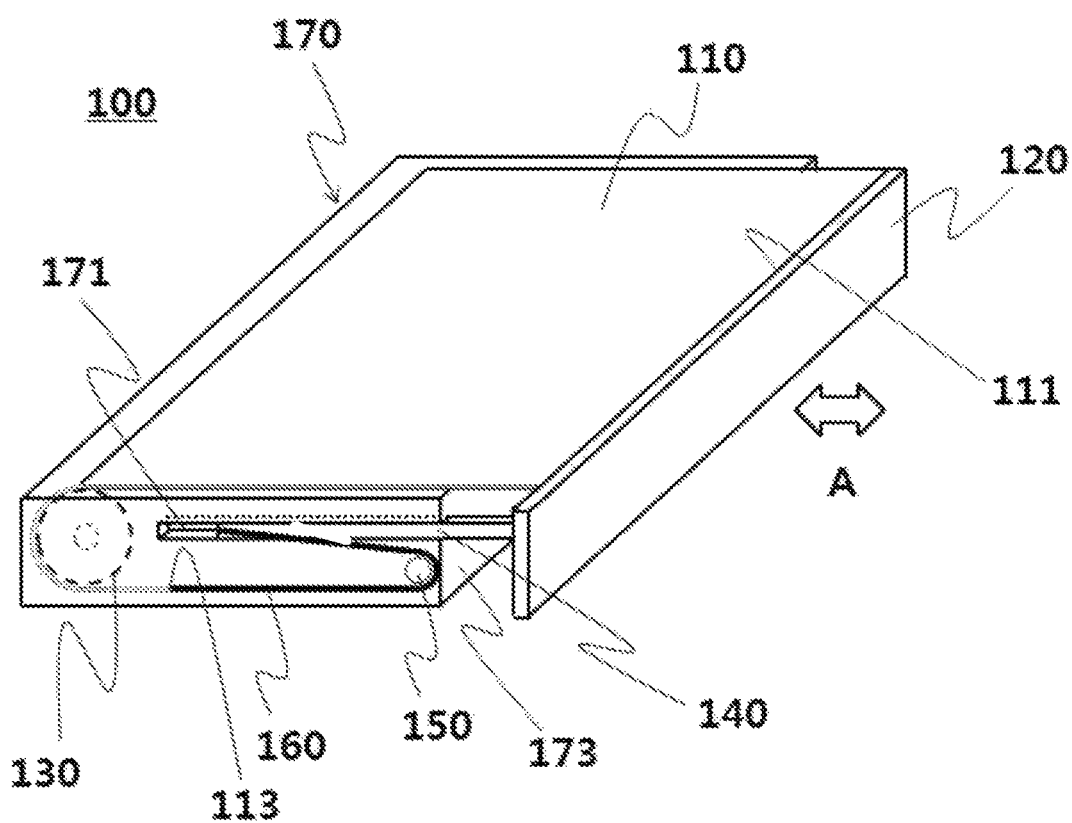
FIGS. 1 to 4 are diagrams for describing a first embodiment of a display expansion type mobile terminal with a sliding motion according to the present disclosure.
Figure 2:
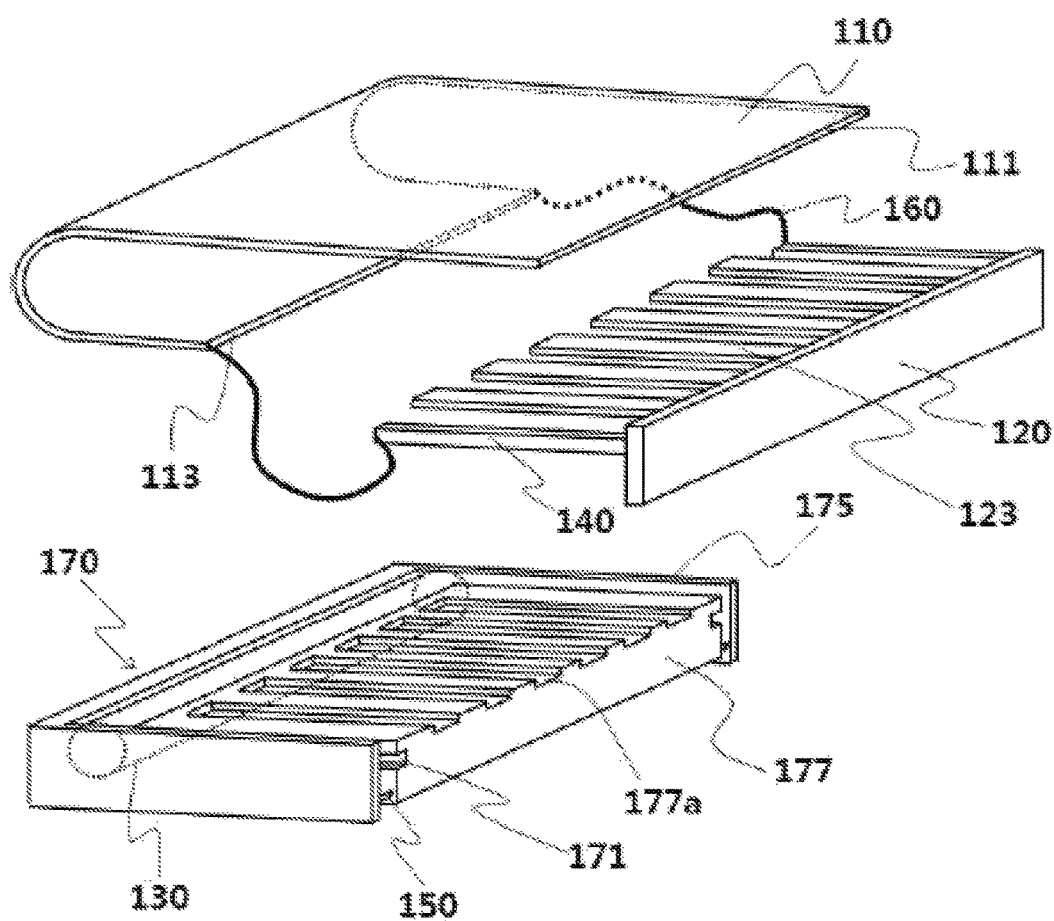
Figure 3:
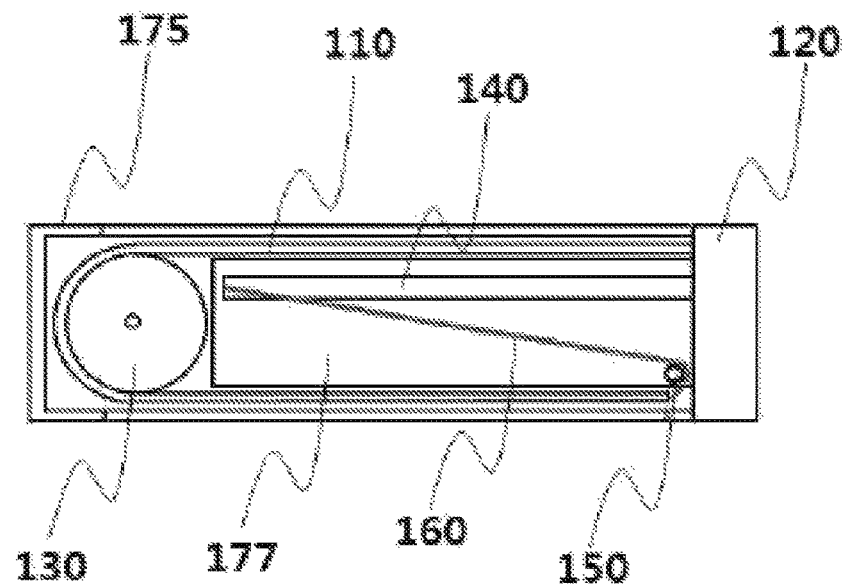
Figure 4:
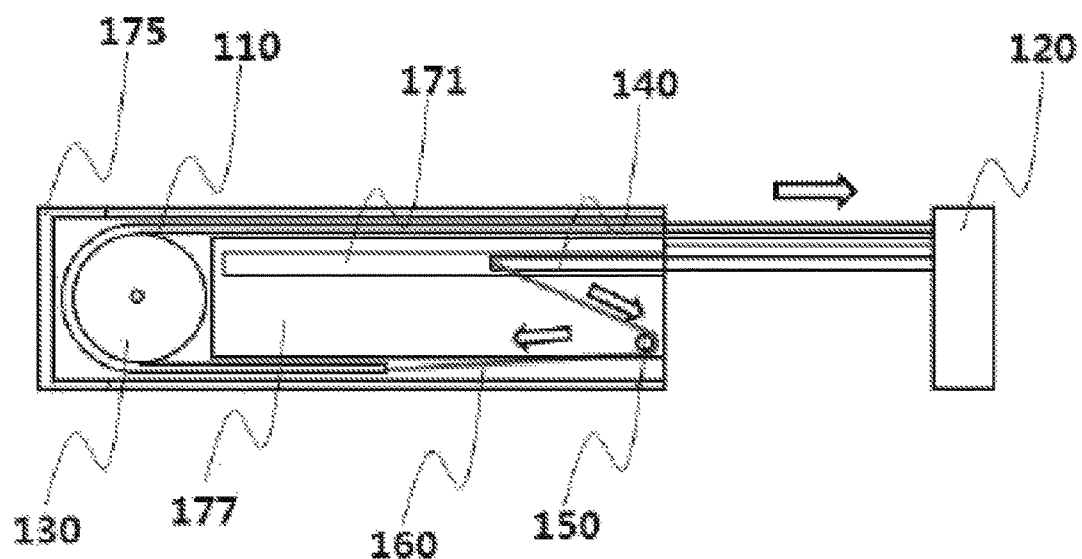

FIG. 1 is a view illustrating a schematic outline, FIG. 2 is an exploded view of FIG. 1, and FIGS. 3 and 4 are diagrams for describing an operation state of FIG. 1.

Referring to FIGS. 1 to 4, the display expansion type mobile terminal 100 with a sliding motion according to the embodiment includes a flexible display device 110, a fixed end frame 120, a via member 130, an extension frame 140, a movable member 150, and a connection member 160.

The flexible display device 110 is provided in a rectangular shape and has a first front end 111 and a second front end 113 at both ends in a predetermined display size adjustment direction A.

The fixed end frame 120 has a structure in which the first front end 111 is fixed.

The fixed end frame 120 serves as a handle for driving a sliding motion of the flexible display device 110.

The via member 130 is a component for a function to enable the flexible display device 110 to change a sliding direction to an opposite direction while the flexible display device 110 is bent.

The via member 130 is provided independently of the fixed end frame 120 and disposed in parallel with the first front end 111 and provided in a columnar shape.

Accordingly, the via member 130 is provided in such a manner that as the fixed end frame 120 reciprocates in the predetermined display size adjustment direction A, the flexible display device 110 passes by to surround the circumference of the fixed end frame 120.

The extension frame 140 extends from the fixed end frame 120 to a position adjacent to the via member 130 in the predetermined display size adjustment direction A.

The extension frame 140 allows the flexible display device 110 to smoothly reciprocate in the predetermined display size adjustment direction A together with the movable member 150 and the connection member 160 to be described below.

In particular, in an operation state in which the display is reduced, the second front end 113 of the flexible display device 110 is pulled to the bottom surface of FIG. 1 to move the second front end 113 to a predetermined path.

To this end, the movable member 150 is spaced apart from the via member 130 by an interval corresponding to a length of the extension frame 140.

One end of the connection member 160 is fixed to the second front end 113 and the other end is fixed to the terminal end of the extension frame 140 via the movable member 150.

Accordingly, the connection member 160 guides a movement path of the second front end 113 with a reciprocating motion of the fixed end frame in the predetermined display size adjustment direction A.

Meanwhile, the display expansion type mobile terminal 100 with a sliding motion according to the embodiment preferably includes a main body 170.

The main body 170 is provided with a base coupled with the via member 130 and having the movable member 150.

Further, the main body 170 has a guide groove which accommodates the extension frame 140 to reciprocate in the predetermined display size adjustment direction A and has an inlet end through which the extension frame 140 is accommodated and a terminal end which is an opposite side to the inlet end.

In this case, the via member 130 is disposed at a position adjacent to the terminal end of the guide groove 171 in a direction perpendicular to the extension frame 140.

Further, the movable member 150 is disposed at a position adjacent to the inlet end of the guide groove 171.

Meanwhile, in the display expansion type mobile terminal 100 with a sliding motion according to the embodiment, the connection member 160 is provided as a flexible member (e.g., a cord or a band) and is preferably disposed in parallel with the extension frame 140 at a portion where the second front end 113 and the movable member 150 are connected.

To this end, the main body 170 has an external frame 175 having opened upper and lower surfaces, a rectangular parallelepiped accommodation space therein, and a fixed end contact surface 173 corresponding to the fixed end frame 120 on one side.

In this case, the via member 130 is disposed in parallel with the fixed end frame 120 on an opposite side of the fixed end contact surface 173 as an interior of the accommodation space and both longitudinal ends thereof are supported by the external frame 175.

Further, the main body 170 preferably includes a support member 177 which is disposed and fixed in a space between the fixed end contact surface 173 and the via member 130 and supports the flexible display devices 110 disposed on the upper and lower surfaces thereof and has at least one fixed end guide slot 177a provided on at least one surface of the upper and lower surfaces and disposed in parallel with the predetermined display size adjustment direction A.

Correspondingly, the fixed end frame 120 preferably has a fixed end guide protrusion 123 which is coupled to at least one fixed end guide slot 177a and slidably moves.

Meanwhile, in the embodiment, the guide groove 171 and the movable member 150 are provided on at least one of both side surfaces of the support member 177 corresponding to both longitudinal ends of the via member 130.

Figure 5:
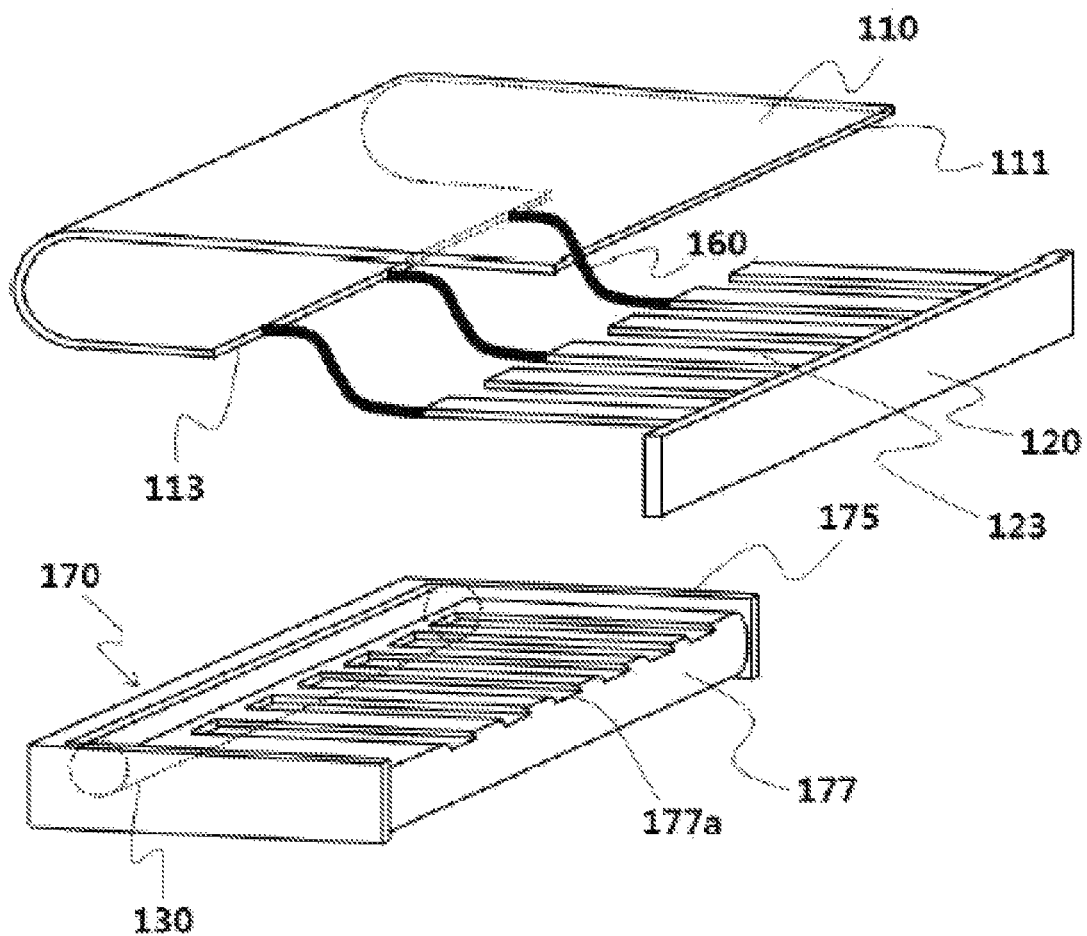
FIGS. 5 and 6 are diagrams for describing a second embodiment of a display expansion type mobile terminal with a sliding motion according to the present disclosure.
Figure 6:
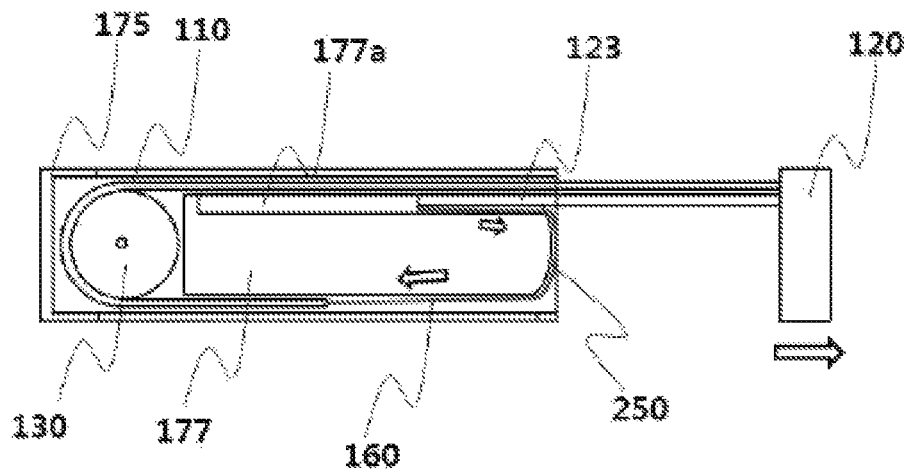

Next, FIGS. 5 and 6 are diagrams for describing a second embodiment of a display expansion type mobile terminal with a sliding motion according to the present disclosure.

Referring to FIGS. 5 and 6, in the display expansion type mobile terminal 100 with a sliding motion according to the embodiment, the guide groove 171 is provided as at least one fixed end guide slot 177a and the extension frame 140 is provided as the fixed end guide protrusion 123 unlike the first embodiment described above.

That is, in the embodiment, the fixed end guide slot 177a and the fixed end guide protrusion 123 simultaneously perform the functions of the guide groove 171 and the extended frame 140 in the first embodiment, respectively.

Therefore, according to the embodiment, there is an advantage in that the guide groove 171 and the extension frame 140 may be omitted.

However, in the embodiment, the movable member 150 is preferably provided as a convex curved surface 250 which is formed on the side surface of the support member 177 corresponding to the fixed end frame 120 and extends from the lower surface of the support member 177 to at least one fixed end guide slot 177a.

Accordingly, the movable member 150 guides the connection member 160 of which one end is coupled to the fixed end guide protrusion 123 to at least one fixed end guide slot 177a.

Figure 7:
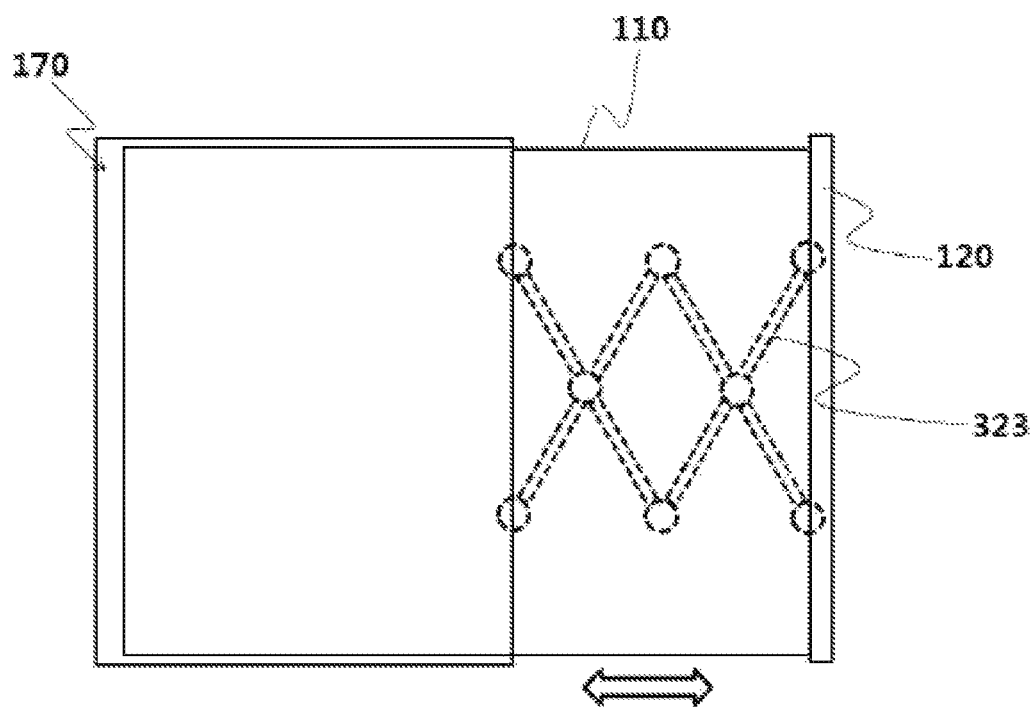
FIG. 7 is a diagram for describing a third embodiment of a display expansion type mobile terminal with a sliding motion according to the present disclosure.

Next, FIG. 7 is a diagram for describing a third embodiment of a display expansion type mobile terminal with a sliding motion according to the present disclosure.

Referring to FIG. 7, the display expansion type mobile terminal 100 with a sliding motion according to the embodiment is the same as that of the first embodiment described above in that the main body 170 includes the external frame 175 having the opened upper and lower surfaces, the rectangular parallelepiped accommodation space therein, and the fixed end contact surface 173 corresponding to the fixed end frame 120 on one side, the via member 130 disposed in parallel with the fixed end frame 120 on the opposite side of the fixed end contact surface 173 as the interior of the accommodation space and having both longitudinal ends supported by the external frame 175, and the support member 177 which is disposed and fixed in the space between the fixed end contact surface 173 and the via member 130 and supports the flexible display devices 110 disposed on the upper and lower surfaces thereof.

However, the display expansion type mobile terminal 100 with a sliding motion according to the embodiment is different from that of the first embodiment in that the display expansion type mobile terminal 100 includes a link member 323 having both ends coupled to the fixed end frame 120 and the fixed end contact surface 173 and folded when the fixed end frame 120 moves in the predetermined display size adjustment direction A.

In this case, the guide groove 171 and the movable member 150 are preferably provided on at least one of both side surfaces of the support member 177 corresponding to both longitudinal ends of the via member 130 as described in the first embodiment.

Figure 8:
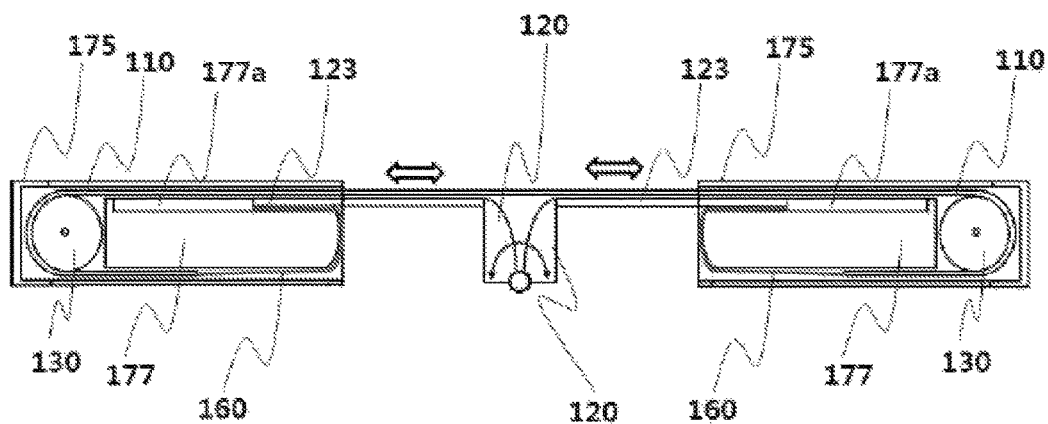
FIGS. 8 and 9 are diagrams for describing a fourth embodiment of a display expansion type mobile terminal with a sliding motion according to the present disclosure.
Figure 9:
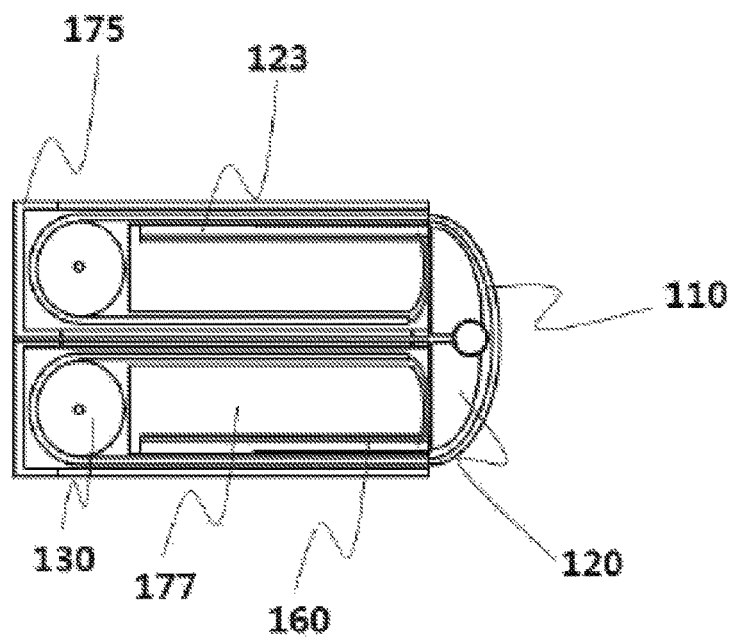

Next, FIGS. 8 and 9 are diagrams for describing a fourth embodiment of a display expansion type mobile terminal with a sliding motion according to the present disclosure.

Referring to FIGS. 8 and 9, the display expansion type mobile terminal 100 with a sliding motion according to the embodiment is characterized in that two display expansion type mobile terminals with a sliding motion according to the first and second embodiments are combined and provided.

Accordingly, there is an advantage in that a maximum expansion area of the display may be increased or a volume may be reduced in the same maximum expansion area.

Specifically in the embodiment, two display expansion type mobile terminals with a sliding motion according to the first and second embodiments are disposed symmetrically to each other and the first front ends 111 of two display expansion type mobile terminals are connected to each other. That is, one flexible display device is used.

Meanwhile, the respective fixed end frames 120 are pivotably hinged with a longitudinal direction of the fixed end frame 120 as an axis below surfaces facing each other.

Thus, in a state in which two display expansion type mobile terminals with a sliding motion according to the first and second embodiments are stacked to each other, a display having a minimum size is used, and each of the fixed end frames 120 pivots to primarily expand the display and the main body 170 is pulled in opposite directions to secondarily expand the display.

What is claimed is:

1. A display expansion type mobile terminal with a sliding motion, comprising: a flexible display device provided in a rectangular shape and having a first front end and a second front end at both ends in a predetermined display size adjustment direction A, respectively; a fixed end frame to which the first front end is fixed; a via member provided independently of the fixed end frame, disposed in parallel with the first front end and provided in a columnar shape, and provided in such a manner that as the fixed end frame reciprocates in the predetermined display size adjustment direction A, the flexible display device passes by to surround the circumference of the fixed end frame; an extension frame which extends from the fixed end frame to a position adjacent to the via member in the predetermined display size adjustment direction A; a movable member which is spaced apart from the via member by an interval corresponding to a length of the extension frame in the direction A; and a connection member having one end fixed to the second front end and the other end fixed to the terminal end of the extension frame via the movable member and guiding a movement path of the second front end with a reciprocating motion of the fixed end frame in the predetermined display size adjustment direction A.

2. The display expansion type mobile terminal with a sliding motion of claim 1, further comprising:
a main body coupled with the via member and having the movable member,
wherein the main body includes a guide groove which accommodates the extension frame to reciprocate in the predetermined display size adjustment direction A and has an inlet end through which the extension frame is accommodated and a terminal end which is an opposite side to the inlet end,
the via member is disposed at a position adjacent to the terminal end of the guide groove in a direction perpendicular to the extension frame, and
the movable member is disposed at a position adjacent to the inlet end of the guide groove.

3. The display expansion type mobile terminal with a sliding motion of claim 2, wherein the connection member is provided as a flexible member and is disposed in parallel with the extension frame at a portion where the second front end and the movable member are connected.

4. The display expansion type mobile terminal with a sliding motion of claim 3, wherein the main body includes
an external frame having the opened upper and lower surfaces, a rectangular parallelepiped accommodation space therein, and a fixed end contact surface corresponding to the fixed end frame on one side,
the via member disposed in parallel with the fixed end frame on the opposite side of the fixed end contact surface as the interior of the accommodation space and having both longitudinal ends supported by the external frame, and
a support member which is disposed and fixed in the space between the fixed end contact surface and the via member and supports the flexible display devices disposed on the upper and lower surfaces thereof and has at least one fixed end guide slot provided on at least one surface of the upper and lower surfaces and disposed in parallel with the predetermined display size adjustment direction A.

5. The display expansion type mobile terminal with a sliding motion of claim 4, wherein the fixed end frame has a fixed end guide protrusion which is coupled to at least one fixed end guide slot and slidably moves.

6. The display expansion type mobile terminal with a sliding motion of claim 5, wherein the guide groove and the movable member are provided on at least one of both side surfaces of the support member corresponding to both longitudinal ends of the via member.

7. The display expansion type mobile terminal with a sliding motion of claim 5, wherein the guide groove is provided as at least one fixed end guide slot,
the extension frame is provided as the fixed end guide protrusion, and
the movable member is provided as a convex curved surface which is formed on the side surface of the support member corresponding to the fixed end frame and extends from the lower surface of the support member to at least one fixed end guide slot.

8. The display expansion type mobile terminal with a sliding motion of claim 7, wherein the movable member guides the connection member of which one end is coupled to the fixed end guide protrusion to at least one fixed end guide slot.

9. The display expansion type mobile terminal with a sliding motion of claim 3, wherein the main body includes
the external frame having the opened upper and lower surfaces, a rectangular parallelepiped accommodation space therein, and a fixed end contact surface corresponding to the fixed end frame on one side,
the via member disposed in parallel with the fixed end frame on the opposite side of the fixed end contact surface as the interior of the accommodation space and having both longitudinal ends supported by the external frame, the support member which is disposed and fixed in the space between the fixed end contact surface and the via member and supports the flexible display devices disposed on the upper and lower surfaces thereof, and a link member having both ends coupled to the fixed end frame and the fixed end contact surface and folded when the fixed end frame moves in the predetermined display size adjustment direction A, and the guide groove and the movable member are provided on at least one of both side surfaces of the support member corresponding to both longitudinal ends of the via member.

10. The display expansion type mobile terminal with a sliding motion of claim 2, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

11. The display expansion type mobile terminal with a sliding motion of claim 3, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

12. The display expansion type mobile terminal with a sliding motion of claim 4, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

13. The display expansion type mobile terminal with a sliding motion of claim 5, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

14. The display expansion type mobile terminal with a sliding motion of claim 6, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

15. The display expansion type mobile terminal with a sliding motion of claim 7, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

16. The display expansion type mobile terminal with a sliding motion of claim 8, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

17. The display expansion type mobile terminal with a sliding motion of claim 9, wherein two display expansion type mobile terminals with a sliding motion are provided, two display expansion type mobile terminals with a sliding motion are disposed symmetrically to each other, the first front ends of two display expansion type mobile terminals are connected to each other, and the respective fixed end frames are pivotably hinged with a longitudinal direction of the fixed end frame as an axis below surfaces facing each other.

* * * * *